(12) United States Patent
Mahdian et al.

(10) Patent No.: US 8,401,984 B2
(45) Date of Patent: Mar. 19, 2013

(54) IDENTIFICATION AND MEASUREMENT OF SOCIAL INFLUENCE AND CORRELATION

(75) Inventors: Mohammad Mahdian, Santa Clara, CA (US); Shanmugasundaram Ravikumar, Santa Clara, CA (US); Aris Anagnostopoulos, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 678 days.

(21) Appl. No.: 12/547,960

(22) Filed: Aug. 26, 2009

(65) Prior Publication Data
US 2011/0055132 A1    Mar. 3, 2011

(51) Int. Cl.
*G06N 5/00* (2006.01)
(52) U.S. Cl. ............................ 706/46; 706/45
(58) Field of Classification Search .................... 706/46, 706/45
See application file for complete search history.

(56) References Cited

PUBLICATIONS

Anagnostopoulos, et al., Influence and Correlation in Social Networks, 14th ACM SIGKDD International Conference on Knowledge Discovery and Data Mining (KDD), Aug. 2008, pp. 1-9.*
Kumar, Social Networks Analysis, Lecture Notes, Yahoo! Research, Jan. 9, 2009, pp. 1-45.*
Christakis et al., "The Spread of Obesity in a Large Social Network over 32 Years", The New England Journal of Medicine, retrieved from <www.nejm.org> on Aug. 26, 2009, Published Jul. 26, 2007, pp. 370-379.
Young, "The Diffusion of Innovations in Social Networks", May 2000, pp. 1-20.
Marlow et al., "HT06, Tagging Paper, Taxonomy, Flickr, Academic Article, ToRead", Proceeding of the Seventeenth Conference of Hypertext and Hypermedia, 2006, 9 pages.
Kempe et al.,"Maximizing the Spread of Influence through a Social Network", Proceedings of the ninth ACM SIGKDD international conference on Knowledge discovery and data mining, 2003, 10 pages.
Backstrom et al., "Group Formation in Large Social Networks: Membership, Growth, and Evolution", Proceedings of the 12th ACM SIGKDD international conference on Knowledge discovery and data mining, Aug. 20-23, 2006, 11 pages.
Backstrom et al.,"Spatial Variation in Search Engine Queries", Proceedings of the 17th international conference on World Wide Web, Apr. 21-25, 2008, 10 pages.
Influence and Correlation in Social Networks, video available at <http://videolectures.net/mlg08_mahdian_icsn/> published Aug. 25, 2008, retrieved on Sep. 11, 2012, webpage from which video can be obtained submitted herewith.

* cited by examiner

*Primary Examiner* — Wilbert L Starks
(74) *Attorney, Agent, or Firm* — Fiala & Weaver P.L.L.C.

(57) ABSTRACT

Techniques for detecting social influence between users in a set of users with regard to an activity are provided. Data for each user of the set of users is received that includes a time value at which the user became active with regard to the activity, and includes at least one indication of another user in the set of users associated with the user. A first estimate of social correlation in the set of users is determined based on the data. The data is modified. For instance, the data may be modified according to a shuffle test and/or an edge reversal test. A second estimate of social correlation in the set of users is determined based on the modified data. The first estimate is compared to the second estimate to determine a degree of social influence in the set of users.

17 Claims, 9 Drawing Sheets

302

504

IDENTIFICATION AND MEASUREMENT OF SOCIAL INFLUENCE AND CORRELATION

BACKGROUND OF THE INVENTION

1. Field of the Invention

The present invention relates to the analysis of social correlation in social networks.

2. Background

Social networking services and systems exist on the World Wide Web that are intended to build online social networks for communities of people having common interests and/or activities, or who are interested in exploring the interests and activities of others. Such systems provide various ways for users to interact, including blogging, discussion groups, email, file sharing, instant messaging, online chat, video, voice chat, etc. Social networking systems such as MySpace.com™ and Facebook™ enable users to create self-description pages (also referred to as a "profile page"), and enable the users to link their pages with pages of friends.

In many such online social systems, social ties between users play an important role in dictating their behavior. One of the ways this can happen is through social influence. According to social influence, the actions of a user can induce his/her friends to behave in a similar way. In social systems where social influence may be exerted, ideas, modes of behavior, new technologies, and/or further concepts can be diffused through the social network by the users. As such, understanding how social influence is manifested within a social network may be leveraged by entities that desire to market products and services to users in the social network.

However, detecting social influence in a social network is a difficult task because it is difficult to distinguish the effects of social influence from other factors that may be present. Examples of such other factors include homophily, where individuals tend to befriend others who are similar to them and thus perform similar actions, or further unobserved confounding variables that can induce a statistical correlation between the actions of friends in a social network. Distinguishing social influence from such factors is similar to the problem of distinguishing correlation from causality, which is a notoriously difficult statistical problem.

BRIEF SUMMARY OF THE INVENTION

Techniques are provided for detecting social influence between users in social networks with regard to particular actions/activities in the social networks. Social influence may be detected based on data associated with the social network, such as data indicating relationships/associations within the social network, as well as time stamps indicating times that users in the social network become active with respect to the activity. The social network data may be analyzed to determine a first estimate of social correlation. The social network data may be modified, such as by modifying the indicated relationships/associations and/or the time stamps. A second estimate of social correlation may be generated based on the modified social network data, and the first and second estimates may be compared to detect whether social influence is present. A particular level or degree of the social influence present in the social network with regard to the activity may optionally be determined.

In one implementation, a method for detecting social influence between users in a set of users with regard to an activity is provided. Data for each user of the set of users is received that includes a time value at which the user became active with regard to the activity, and includes at least one indication of another user in the set of users associated with the user. A first estimate of social correlation in the set of users is determined based on the data. The data is modified. For instance, the data may be modified according to a shuffle test and/or an edge reversal test. A second estimate of social correlation in the set of users is determined based on the modified data. The first estimate is compared to the second estimate to determine a degree of social influence in the set of users.

In another implementation, a system for detecting social influence between users in a set of users with regard to an activity is provided. The system includes a social correlation determiner, a data modifier, and a social correlation comparator. The social correlation determiner receives data for each user of the set of users that includes a time value at which the user became active with regard to the activity, and includes at least one indication of another user in the set of users associated with the user. The social correlation determiner is configured to determine a first estimate of social correlation in the set of users based on the data. The data modifier is configured to modify the data. The social correlation determiner is configured to receive the modified data, and to determine a second estimate of social correlation in the set of users based on the modified data. The social correlation comparator is configured to compare the first estimate to the second estimate to determine a degree of social influence in the set of users.

In one aspect, the social correlation determiner may include an active user determiner, an inactive user determiner, and a logistic regression estimator. The active user determiner is configured to determine a first number of users $Y_{c,t}$ of the set of users for each time t of a plurality of times t that each had a number of c associated active users at time t and that became active at time t. The inactive user determiner is configured to determine a first number of users $N_{c,t}$ of the set of users for each time t of the plurality of times t that each were inactive at time t, had a number of c associated active users at time t, and did not become active at time t. The logistic regression estimator is configured to generate a first estimate of a coefficient α using a maximum likelihood logistic regression based on the determined first number of users $Y_{c,t}$ and the determined first number of users $N_{c,t}$. The coefficient α indicates a degree of social correlation in the set of users. The active user determiner is configured to determine a second number of users $Y_{c,t}$ of the set of users for each time t of the plurality of times t based on the modified data. The inactive user determiner is configured to determine a second number of users $N_{c,t}$ of the set of users for each time t of the plurality of times t based on the modified data. The logical regression estimator is configured to generate a second estimate of the coefficient α using the maximum likelihood logistic regression based on the determined second number of users $Y_{c,t}$ and the determined second number of users $N_{c,t}$. The social correlation comparator is configured to compare the first estimate of the coefficient α to the second estimate of the coefficient α to determine the degree of social influence.

In a further aspect, the logical regression estimator may include a first summer, a second summer, and an expression maximizer. The first summer, the second summer, and the expression maximizer are configured to process the unmodified data to generate the first estimate, and to process the modified data to generate the second estimate. In each case, the first summer is configured to calculate $Y_c$ for each value of c, where $$Y_c = \sum_t Y_{c,t}.$$

The second summer is configured to calculate $N_c$ for each value of c, where $$N_c = \sum_t N_{c,t}.$$

The expression maximizer is configured to determine a value of the coefficient α and a value of a coefficient β that maximize $$\prod_c p(c)^{Y_c}(1-p(c))^{N_c} \text{ where } p(c) = \frac{e^{\alpha \ln(c+1)+\beta}}{1+e^{\alpha \ln(c+1)+\beta}}.$$

In another aspect, the data modifier may include a time value shuffle module configured to shuffle time values in the data between users of the set of users. In another implementation, the data modifier may include an edge reversal module configured to reverse a direction of each indication of association between users of the set of users in the data.

Computer program products are also described herein. The computer program products include a computer-readable medium having computer program logic recorded thereon for enabling social influence to be detected between users in a set of users with regard to an activity, as well as enabling further embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
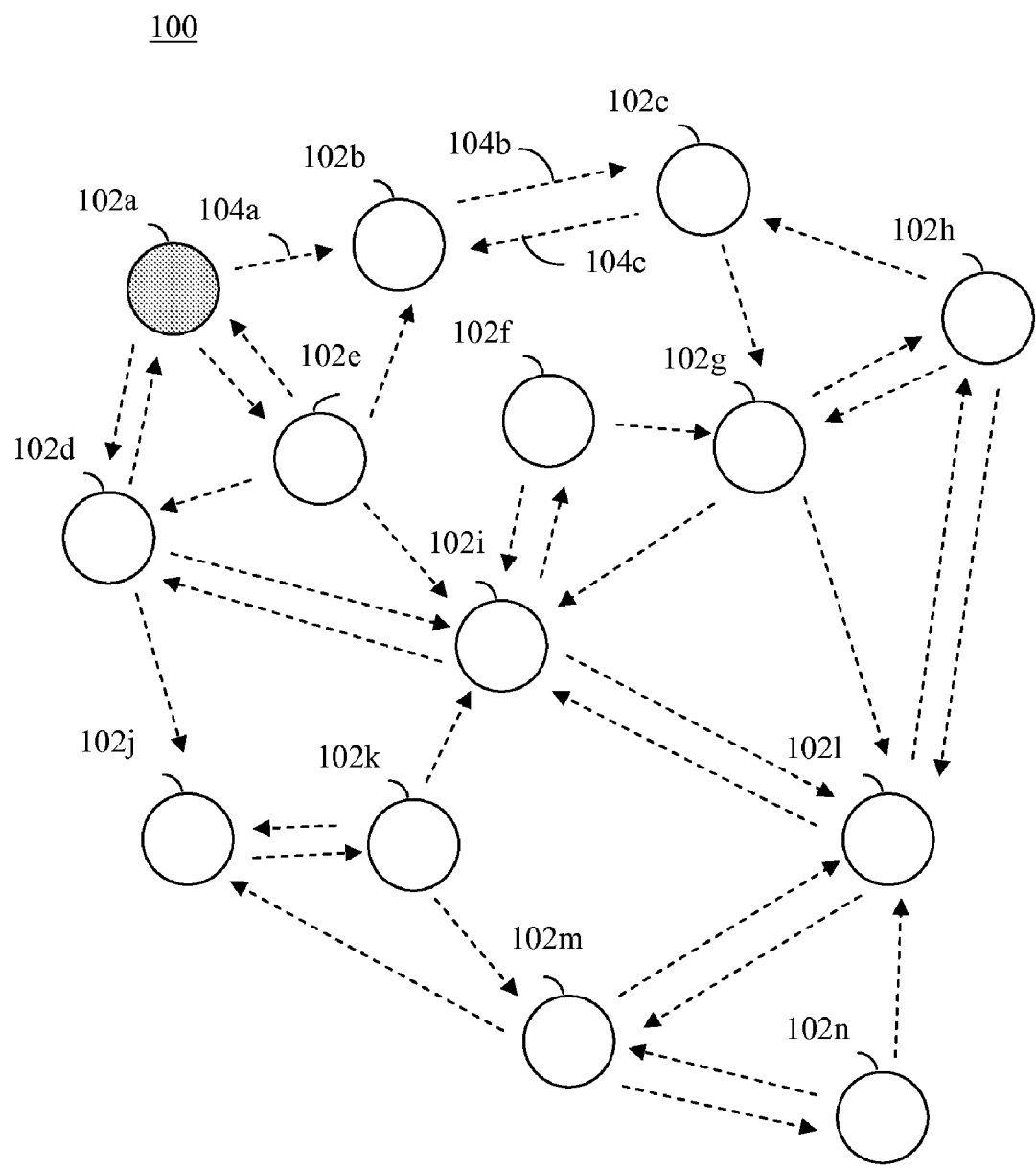
FIGS. 1 and 2 show block diagrams of a social network represented as a directed graph.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments

Online social systems play an ever-important role in shaping the behavior of users on the World Wide Web ("the Web"). Currently popular social websites such as Facebook™ (social networking), MySpace™ (social networking), Flickr® (photo/video sharing), and Del.icio.us™ (social bookmarking), are receiving increasingly greater amounts of user traffic and are turning into community spaces, where users interact with their friends and acquaintances. Such social systems may track the interactions between their users, including tracking which users are indicated as associated with each other (e.g., as "friends," "family," "followers," etc.), tracking interactions of the users with content, etc. The availability of tracking data for social interactions at never-before available scales enables user actions to be analyzed at an individual level in order to understand user behavior. A user's actions in the context of his/her online associates may be analyzed, including the correlating of the actions of socially connected users. For example, the membership problem has been studied in an online community, where a correlation between the action of a user joining an online community and the number of friends who are already members of that community was observed (see Backstrom et al., "Group Formation in Large Social Networks: Membership, Growth, and Evolution," 12th KDD, Proceedings of the 12th ACM SIGKDD International Conference on Knowledge Discovery and Data Mining, 2006, pages 44-54). In another example, the tag usage problem in Flickr™ was considered, and the set of tags placed by a user and those placed by the friends of the user were studied, showing a correlation between social connectivity and tag vocabulary (see Marlow et al., "HT06, tagging paper, taxonomy, Flickr, academic article, to read," in Proceedings of the Seventeenth Conference on Hypertext and Hypermedia (New York: ACM Press), 2006, pages 31-40).

While such studies have established the existence of correlation between user actions and social affiliations, they do not address the source of the correlation. Causes of correlation in social networks can be categorized into roughly three types. The first cause is social influence (also known as induction), where the action of a user is triggered by one of his/her friend's recent actions. An example of social influence is when a user buys a product because one of his/her friends has recently bought the same product. The second cause is homophily, where persons tend to befriend other persons who are similar to them, and hence perform similar actions. In an example of homophily, a first pair of individuals that each own a Microsoft® Xbox® video game system are more likely to become friends due to the common interest, as compared to a second pair of individuals, where one or both of the individuals does not own a Microsoft® Xbox® video game system. The third cause is environment (also known as confounding factors or external influence), where external factors are correlated both with the event that two individuals become friends and also with their actions. In an example of confounding factors, two friends are likely to live in the same city, and therefore may be likely to post pictures of the same landmarks in an online photo sharing system.

The ability to identify situations where social influence is a source of correlation is important. In the presence of social influence, an idea, a norm of behavior, a product, or other entity or concept diffuses through the social network in a similar fashion as an epidemic. A marketing firm, for example, may desire to use social influence information to design viral marketing campaigns or to provide coupons to influential nodes in a social network, or a system designer may take advantage of such information in order to induce users to follow a desired mode of behavior. There has already been significant research on methods for designing strategies to leverage social influence in such systems (see D. Kempe et al., "Maximizing the Spread of Influence Through a Social Network," 9th KDD, Proceedings of the Ninth ACM SIGKDD International Conference on Knowledge Discovery and Data Mining, 2003, pages 137-146) and on the effect of influence on the growth pattern of new products (see P. Young, "The Diffusion of Innovations in Social Networks," in L. E. Blume and S. N. Durlauf, editors, The Economy as a Complex Evolving System, Volume III. Oxford University Press, 2003). A core idea in viral marketing strategies is that in cases where social influence between users is prevalent, careful targeting can have a cascading effect on the adoption of a product/technology. Therefore, being able to identify in which cases social influence prevails is an important step to marketing strategy design.

Because social influence is important, it is desired to be enabled to test whether a given social system exhibits signs of social influence. This is a particularly difficult problem in online settings where individuals are often anonymous and therefore it is difficult, if not impossible, to control for all potential confounding factors. In embodiments, the availability of data about the timing of actions that occur in online settings is leveraged to enable the presence of social influence to be determined by correlation.

Embodiments described herein enable the detection of social influence in social networks. For instance, in one embodiment, a statistical test, which may be referred to as "the shuffle test," is used to determine social influence. The shuffle test is based on the concept that if social influence is not a likely source of correlation in a social network, the timing of actions occurring in a social network do not matter, and therefore reshuffling time stamps of actions occurring in the social network does not significantly change the amount of correlation. Thus, with respect to the shuffle test, actions in a social network are analyzed in a non-time shuffled manner and are analyzed in a time-shuffled manner, and the non-time shuffled analysis results and time-shuffled analysis results are compared to determine whether social influence is present in the social network.

In another embodiment, another test (which may be referred to as "the edge-reversal test") is used to determine the presence of social influence. The edge reversal test is based on the concept that if social influence is not a likely source of correlation in a social network, the spreading of actions through the social network will not depend on the direction of associations (e.g., "friend" relationships and/or other association types) between users in the social network. Because forms of social correlation other than social influence are based on associated users (e.g., "friends") often sharing common characteristics or being affected by the same external variables, and are independent of which of these two users has indicated the other as associated, reversing the edges in the social network does not change the estimate of social correlation significantly. In contrast, social influence does spread in the direction specified by the associations indicated in the social network. Thus, according to the edge reversal test, directions of the edges (associations) between users in the social network are reversed (to form a "reverse graph"), and actions in the reversed social network are analyzed. The reversed analysis results and non-reversed analysis results are compared to determine whether social influence is present in the social network.

A. Example Embodiments for Modeling Social Correlation

In embodiments of the present invention, social correlation is modeled within social systems. In one example, a set of users (also called agents or persons) may be indicated as nodes of a social network. For example, FIG. 1 shows a block diagram of a social network 100 represented as a directed graph "G". Social network 100 includes users 102a-102n (indicated as circular nodes in FIG. 1), for illustrative purposes. In social network 100, users 102 are associated with each other in one-way associations (e.g., as between users 102a and 102b) and in two-way interactions (e.g., as between users 102b and 102c). For example, in a social network where users may designate "friends" as associations, user 102a may indicate user 102b as a friend (as indicated by association indicator 104a directed from user 102a to user 102b) as well as users 102d and 102e. An association list, such as a friends list, may be maintained for each user 102 in social network 100, including an association list for user 102a that lists users 102b, 102d, and 102e as friends of user 102a, an association list for user 102*b* that lists user 102*c* as a friend of user 102*b*, an association list for user 102*c* that lists users 102*b* and 102*g* as friends of user 102*c*, etc. Because an association indicator is not present in social network 100 directed from user 102*b* to user 102*a*, user 102*b* does not indicate user 102*a* as a friend (e.g., user 102*a* is not listed in an association list of user 102*b*).

Social network 100 enables actions or activities by users 102 to be tracked, which can be used to determine social correlation. In an embodiment, performance of a particular action or activity for the first time, such as the purchasing of a product, visiting a web-page, tagging a photo with a particular tag, or any other action(s)/activity(s) is tracked for users 102. After a particular user 102 performs the action, the user is considered to have become active (with respect to the action). Social network 100 may be observed over a particular period of time (e.g., a time period [0; T]) to track times at which particular users 102 become active. "W" may be used to denote the set of users 102 that are active at the end of the time period.

Figure 2:
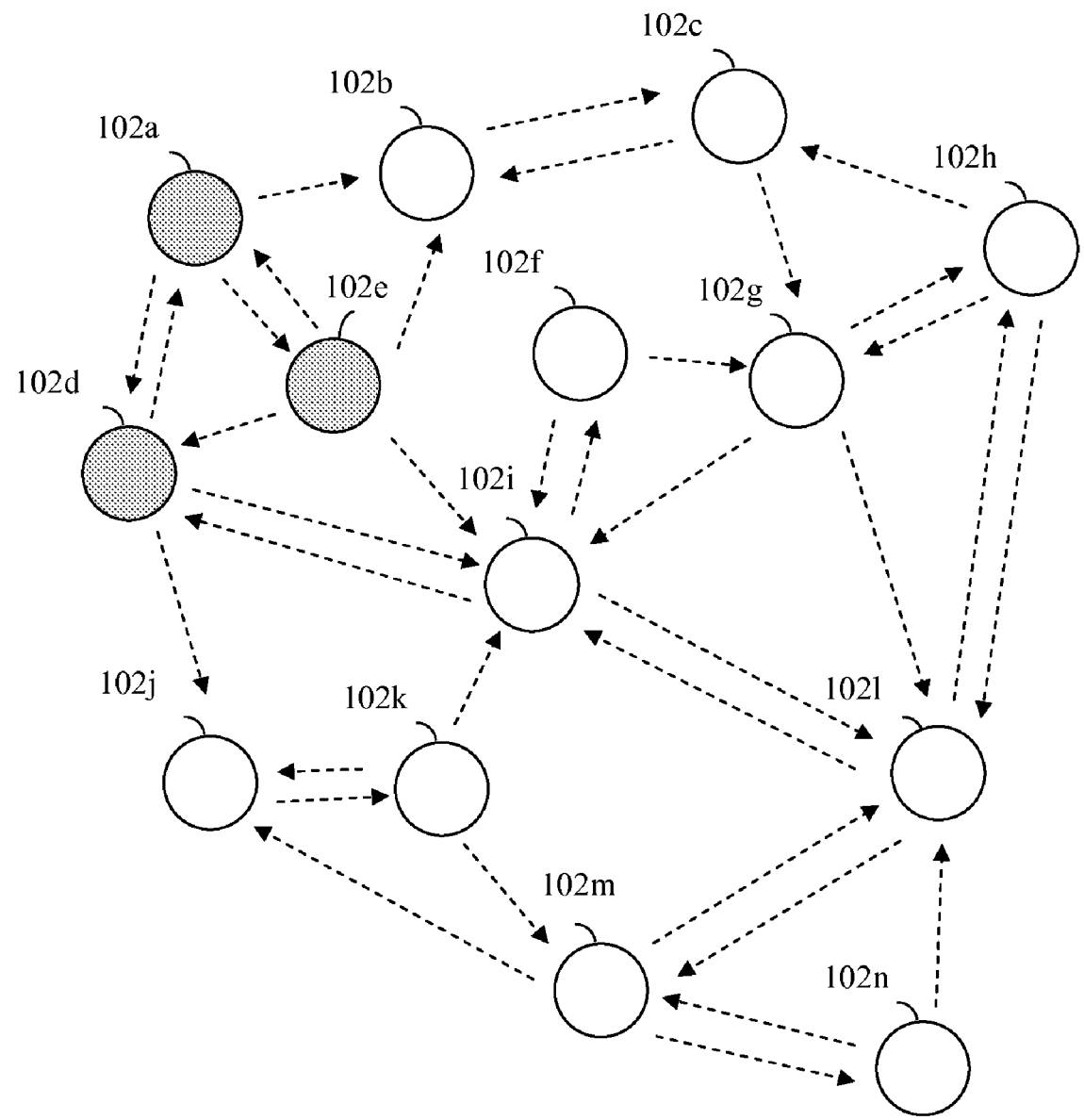

Social correlation may be present in social network 100 for first and second users 102 that are adjacent in directed graph G, where the events that become active with respect to the first user 102 are correlated with the events becoming active with respect to the second user 102. For example, as described above, FIG. 1 shows social network 100, which includes users 102*a*-102*n*. Referring to FIG. 1, a user 102*a* may be considered to be active (e.g., as indicated in FIG. 1 by shading) with respect to a particular activity. For example, user 102*a* may have viewed a particular video on a video sharing website. Associates (e.g., "friends," "followers," etc.) of user 102*a* may also view the video. For example, FIG. 2 shows social network 100, where users 102*d* and 102*e*, which are associated with user 102*a* (e.g., users 102*d* and 102*e* have indicated user 102*a* as a "friend," as indicated by association indicators 104 directed from users 102*d* and 102*e* to user 102*a*) have also viewed the video (as indicated by shading in FIG. 1). Users 102*d* and 102*e* may have been influenced by user 102*a* to view the video, or other factors may have led to users 102*d* and 102*e* viewing the video. As described above, there are at least three explanations for social correlation: homophily, the environment (or confounding factors), and social influence. These factors are described as follows.

Homophily: Homophily is the tendency of individuals to choose friends with similar characteristics. This is a pervasive phenomenon, and may lead to correlation between the actions of adjacent users 102 in social network 100. One example hypothesis for why there is social correlation in membership in an online community is that the users might know each other and become friends after joining the community. Mathematically, in a pure homophily model, the set W of active users 102 is first selected according to some distribution, and then the graph G is picked from a distribution that depends on W. Thus, in FIG. 2, users 102*d* and 102*e* may have viewed the video viewed by user 102*a* because they have similar characteristics with user 102*a*.

Confounding factors: The second explanation for correlation between actions of adjacent users 102 in social network 100 is external influence from elements in the environment (also referred to as confounding factors), which are more likely to affect users 102 that are physically located close to each other in social network 100. Mathematically, this means that there is a confounding variable X, and both the graph G and the set of active users W come from distributions correlated with X. For example, two individuals who live in the same city are more likely to become friends than two random individuals, and they are also more likely to take pictures of similar scenery and post them on an image sharing website using the same tag (e.g., a descriptive label). Thus, in FIG. 2, users 102*d* and 102*e* may have viewed the video viewed by user 102*a* because they are located closely to user 102*a*, and the video may have covered an object in their local vicinity.

Note that there is a fine distinction between confounding factors and homophily. Homophily refers to situations where the set of active users W affects individuals' choices to become friends, while in confounding factors, both the choices of individuals to become friends and their choice to become active are affected by the same unobserved variable. It is possible to distinguish between these models by analyzing the time where the edges (association indicators 104) of G are established.

Social influence: As described above, social influence refers to the phenomenon that the action of individuals can induce their associations (e.g., friends, etc.) to act in a similar way. For example, a first friend may set an example for a second friend (e.g., as in the case of fashion), may inform the second friend about an action (e.g., as in viral marketing), or may increase the value of an action for the second friend (e.g., as in the case of adoption of a communication technology such as facsimile). Thus, in FIG. 2, users 102*d* and 102*e* may have viewed the video viewed by user 102*a* because they were influenced by user 102*a* (e.g., user 102*a* may have recommended the video to users 102*d* and 102*e*).

In an embodiment, social influence can be modeled as follows: a social network graph G may be generated according to a particular distribution. Then, in each of the time steps $1, \ldots, T$, each non-active user may or may not become active. The probability of becoming active for each user u may be a function $p(x)$ of the number x of other users v that have an edge to user u and are already active. In embodiments, $p(x)$ can be any increasing function, including the logistic regression, as is used for illustrative purposes herein.

B. Example Embodiments for Determining Social Influence

Figure 3:
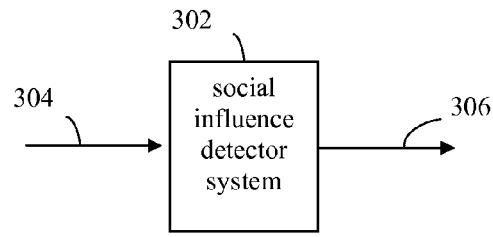
FIG. 3 shows a block diagram of a social influence detector system, according to an example embodiment.

In this subsection, example embodiments are described for measuring social correlation and testing whether social influence is a source of such social correlation. For instance, FIG. 3 shows a block diagram of a social influence detector system 302, according to an example embodiment. Social influence detector system 302 is configured to determine whether social influence is present with regard to a particular action or activity within a network of associated persons, referred to herein as a social network. In one embodiment, social influence detector system 302 may be configured to indicate whether or not social influence is present in the social network with regard to the activity. In another embodiment, social influence detector system 302 may be configured to indicate a particular level or degree of social influence present in the social network with regard to the activity.

As shown in FIG. 3, social influence detector system 302 receives social network data 304. Social network data 304 is data with regard to the activity of users in a social network, such as social network 100 of FIG. 1. Social network data 304 may indicate associations between users in the social network (e.g., "friends lists," "followers/following lists," etc.), including directions of the associations (e.g., whether a first user is indicated as a friend of a second user and/or whether the second user indicates the first user as a friend), and may further include information regarding activities occurring in social network, including time values/time stamps indicating times at which various users in the social network perform a particular activity. Social influence detector system 302 processes social network data 304 to determine whether social influence is detected in the social network. As shown in FIG. 3, social influence detector system 302 generates a social influence indication 306, which indicates whether social influence is detected in the social network, and may indicate a degree of social influence detected to be present.

Figure 4:
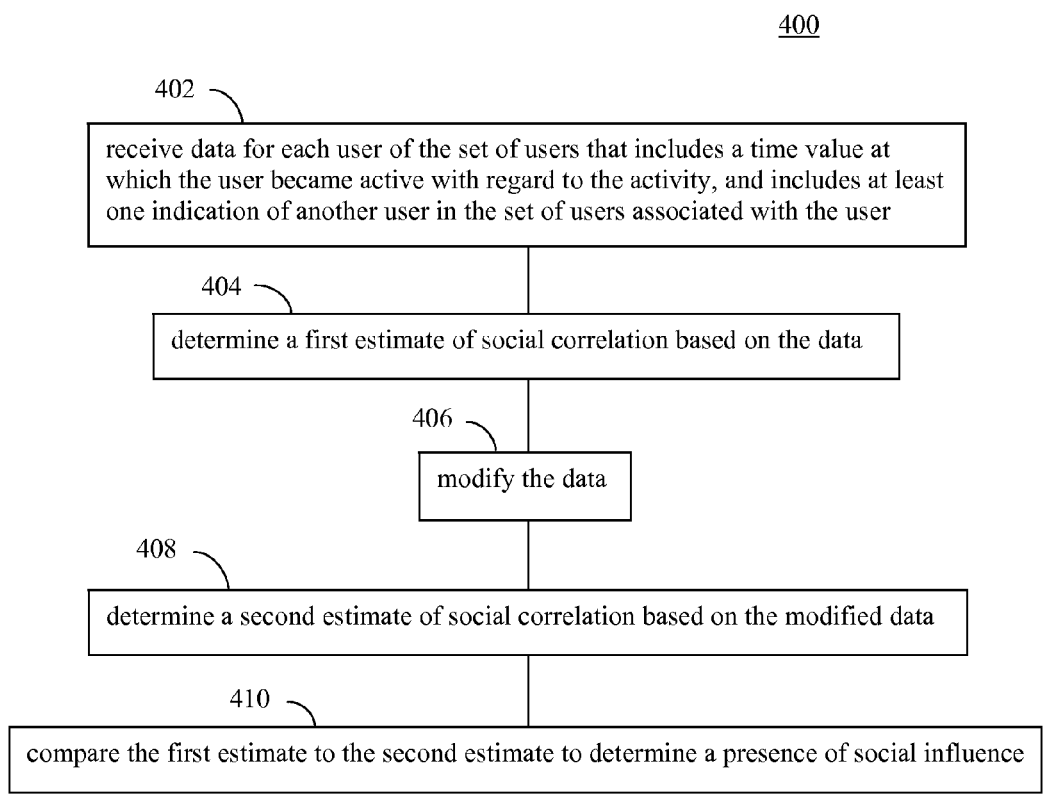
FIG. 4 shows a flowchart for detecting social influence, according to example embodiments.
Figure 5:
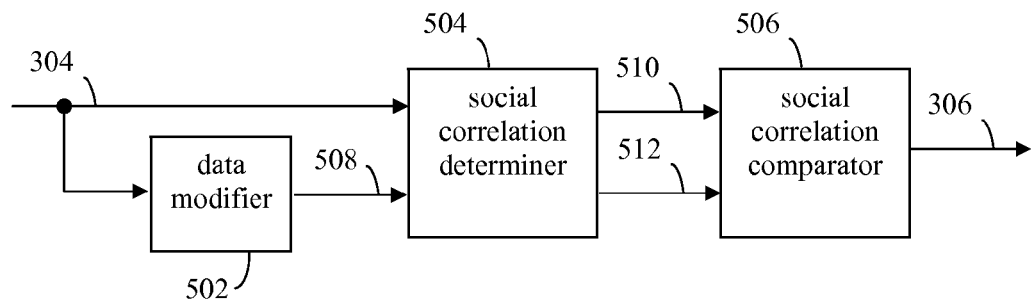
FIG. 5 shows a block diagram of a social influence detector system, according to an example embodiment.

Social influence detector system 302 may detect social influence in a social network in various ways. For instance, FIG. 4 shows a flowchart 400 for detecting social influence, according to example embodiments. In an embodiment, social influence detector system 302 may perform flowchart 400. Further structural and operational embodiments will be apparent to persons skilled in the relevant art(s) based on the discussion regarding flowchart 400. For instance, FIG. 5 shows a block diagram of social influence detector system 302, according to an example embodiment. As shown in FIG. 5, social influence detector system 302 includes a data modifier 502, a social correlation determiner 504, and a social correlation comparator 506. Flowchart 400 is described as follows with reference to social influence detector system 302 of FIG. 5, for illustrative purposes.

Flowchart 400 begins with step 402. In step 402, data for each user of the set of users is received that includes a time value at which the user became active with regard to the activity, and includes at least one indication of another user in the set of users associated with the user. For example, as shown in FIG. 1, social influence detector system 302 receives social network data 304. Social network data 304 may include data for each user of a social network. The data for each user may include a time value indicating a time at which the user became active with respect to the activity of interest. Furthermore, the data for each user may include a list of other users in the social network that are associated (e.g., as "friend," "follower," "family," etc.) with the user (and may indicate the type of association as "friend," "follower," "family," etc.).

For example, referring to FIGS. 1 and 2, social network data 304 may include data for each of users 102a-102n. For user 102a, social network data 304 may indicate users 102b, 102d, and 102e as friends of user 102a, and may indicate that at time t=0, user 102a became active with regard to viewing a particular online video. For user 102d, social network data 304 may indicate users 102a, 102i, and 102j as friends of user 102d, and may indicate that at time t=1, user 102d became active with regard to viewing the particular online video.

Note that the social network may track/record such data in any manner. For example, social network 100 may maintain a "friends" or other type of list for each user 102 in a similar manner as social networks such as Facebook™, MySpace™ Twitter® (a "followers" list), etc. Furthermore, the social network may track/record web page clicks, link clicks, files accessed, images viewed, videos played, items purchased, etc., for each user in any suitable manner as would be known to persons skilled in the relevant art(s).

In step 404, a first estimate of social correlation is determined based on the data. For example, in an embodiment, social correlation determiner 504 in FIG. 5 may be configured to generate a first estimate of social correlation based on social network data 304. As shown in FIG. 5, social correlation determiner 504 generates a first estimate 510.

In step 406, the data is modified. For example, in an embodiment, data modifier 502 may perform step 406 by receiving and modifying social network data 304 to generate modified social network data 508. As described in further detail below, data modifier 502 may be configured to modify social network data 304 in various ways, including shuffling time values between the users of the social network that indicate when each user became active with respect to the activity, reversing the directions of each association in the network, etc.

In step 408, a second estimate of social correlation is determined based on the modified data. For example, in an embodiment, social correlation determiner 504 in FIG. 5 may be configured to generate a second estimate of social correlation based on modified social network data 508. As shown in FIG. 5, social correlation determiner 504 generates a second estimate 512.

In step 410, the first estimate is compared to the second estimate to determine a presence of social influence. For example, in an embodiment, social correlation comparator 506 in FIG. 5 may be configured compare first estimate 510 to second estimate 512 to determine the presence of social influence. As shown in FIG. 5, social correlation comparator 506 generates social influence indication 306. For example, if first and second estimates 510 and 512 are relatively close together in value (e.g., the difference is less than a predetermined threshold value), social influence indication 306 may indicate that social influence was not detected (is not present). If first and second estimates 510 and 512 are relatively far apart in value (e.g., the difference is greater than a predetermined threshold value), social influence indication 306 may indicate that social influence was detected (is present). Furthermore, social correlation comparator 506 may indicate that degree of social influence detected proportional to the difference between first and second estimates 510 and 512 (e.g., a greater amount of social influence is present if the difference is relatively greater; a lesser amount of social influence is present if the difference is relatively less).

Further example embodiments for flowchart 400 and social influence detector system 302 are described in the following subsections.

1. Example Embodiments for Social Correlation

In an embodiment, a measure of social correlation between the actions of a user and associated users in a social network is estimated, according to step 404 of flowchart 400 in FIG. 4. This measure is configured to recover the activation probability, assuming that users follow the social influence model described above. According to the social influence model, each user decides at each time step whether or not to become active. In principle, the probability of activation can vary from user to user and from time to time. In an embodiment, this probability is considered as a function of the number of already-active associated users that the user has.

As described above, the probability (e.g., $p(x)$) can be any increasing function. For example, in an embodiment, a logistic function with the logarithm of the number of associated users as the explanatory variable may be used. For instance, Equation 1 shown below is a logistic function that may be used to estimate a probability $p(c)$ of activation for a user with $c$ already active associated users, in an embodiment:

$$p(c) = \frac{e^{\alpha \ln(c+1)+\beta}}{1 + e^{\alpha \ln(c+1)+\beta}}, \quad \text{Equation 1}$$

where α and β are coefficients. Equation 1 may be written as in equivalent form as Equation 2 below:

$$\ln\left(\frac{p(c)}{1-p(c)}\right) = \alpha \ln(c+1) + \beta \quad \text{Equation 2}$$

The coefficient α measures social correlation: a larger value for a indicates a larger degree of social correlation. A smaller value for a indicates a smaller degree of social correlation.

Figure 6:
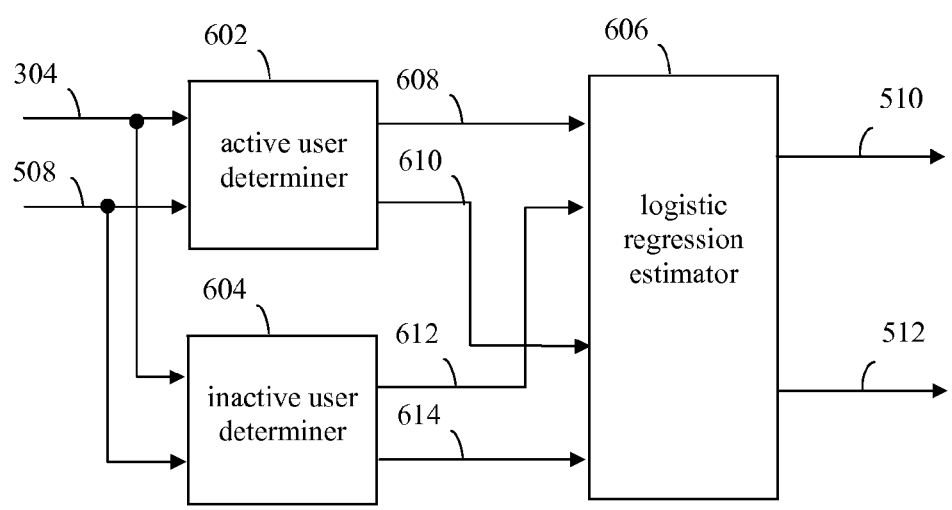
FIG. 6 shows a block diagram of a social correlation determiner, according to an example embodiment.
Figure 7:
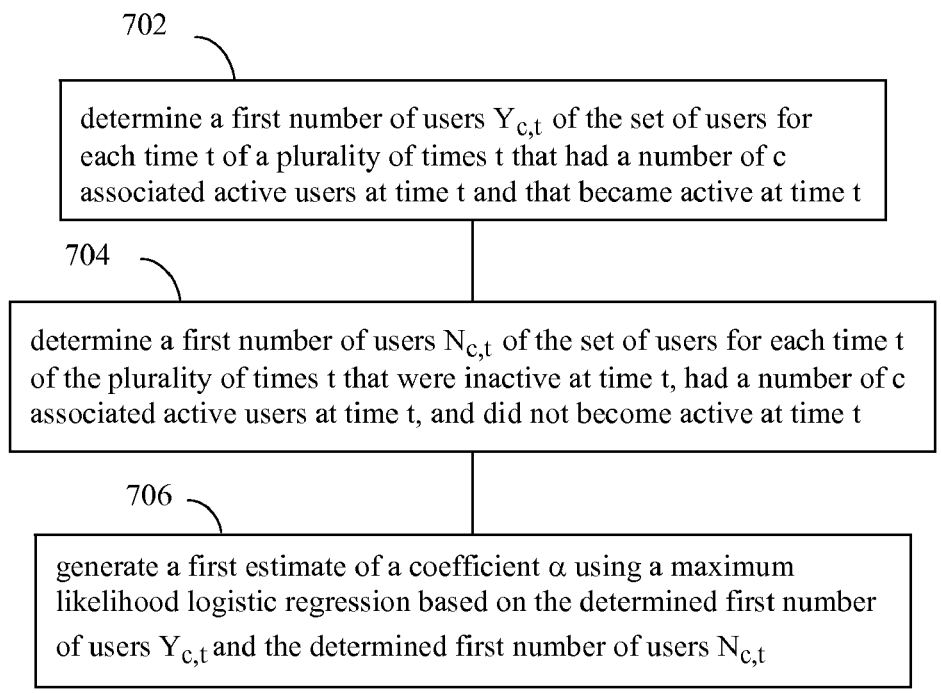
FIG. 7 shows a flowchart for determining social correlation, according to an example embodiment.

In an embodiment, the coefficients α and β may be estimated using maximum likelihood logistic regression. For example, in an embodiment, social correlation determiner 504 of FIG. 5 may be configured to estimate coefficients α and β using maximum likelihood logistic regression. In such an embodiment, social correlation determiner 504 may be configured in various ways. For instance, FIG. 6 shows a block diagram of social correlation determiner 504, according to an example embodiment. As shown in FIG. 6, social correlation determiner 504 includes an active user determiner 602, an inactive user determiner 604, and a logistic regression estimator 606. Social correlation determiner 504 of FIG. 6 is configured to estimate social correlation by estimating coefficients α and β using maximum likelihood logistic regression. Social correlation determiner 504 may determine social correlation various ways. For instance, FIG. 7 shows a flowchart 700 for determining social correlation, according to an example embodiment. In an embodiment, social correlation determiner 504 of FIG. 6 may perform flowchart 700. Further structural and operational embodiments will be apparent to persons skilled in the relevant art(s) based on the discussion regarding flowchart 700. Flowchart 700 and social correlation determiner 504 of FIG. 6 are described as follows.

Flowchart 700 begins with step 702. In step 702, a first number of users $Y_{c,t}$ of the set of users is determined for each time t of a plurality of times t that had a number of c associated active users at time t and that became active at time t. For example, in an embodiment, active user determiner 602 may be configured to perform step 702. As shown in FIG. 6, active user determiner 602 receives social network data 304. Active user determiner 602 analyzes social network data 304 to determine for each time t (e.g., over the time period 0 . . . T) a number of users, designated as $Y_{c,t}$, that had a number c of active associated users at that time t, and that became active at that time t. For instance, active user determiner 602 may perform this function over a range of c, for all c≤R, where R may be an integer selected for a particular application. For example, R may be equal to 10, or to other integer value. As shown in FIG. 6, active user determiner 602 generates active user data 608, which includes the generated values for $Y_{c,t}$ over predetermined ranges of c and t.

Figure 8:
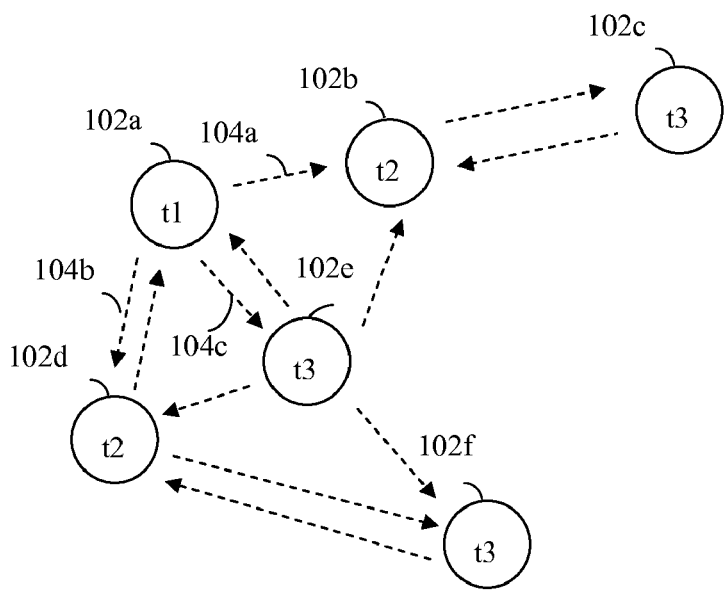
FIG. 8 shows a block diagram of a social network that includes six users, according to an example embodiment.

For instance, FIG. 8 shows a block diagram of a social network 800 that includes six users 102a-102f, according to an example embodiment. FIG. 8 is provided to illustrate determination of values for $Y_{c,t}$. Users 102a-102f become active in social network 800 with regard to an example activity at respective times indicated in FIG. 8 for each user 102 (e.g., user 102a became active at time t=1 (t1), user 102d became active at time t=2 (t2), etc.). The following data shown in Table 1 may be received in social network data 304 for social network 800, in this example of an activity spreading through social network 304:

TABLE 1

| user | time user became active | number of active associated users at the time the user became active |
|---|---|---|
| user 102a | t = 1 | 0 |
| user 102b | t = 2 | 0 |
| user 102c | t = 3 | 1 |
| user 102d | t = 2 | 1 |
| user 102e | t = 3 | 3 |
| user 102f | t = 3 | 1 |

Note that the third column ("the number of active associated users at the time the user became active") in Table 1 indicates, for each user, the number of associated users (e.g., indicated in the user's friends list) that were already active with regard to the activity at the time that the user became active. For example, user 102e became active at time t=3. User 102e has an associations list that includes users 102a, 102b, and 102d. When user 102e became active at time t=3, users 102a, 102b, and 102d listed in user 102e's associations list were already active. Thus, the number 3 is listed in the third column of Table 1 for user 102e.

With regard to the example data of Table 1, active user determiner 602 may calculate the following values for $Y_{c,t}$ shown in Table 2 for each of times t=1, 2, 3 by generating the appropriate sums in a manner as would be understood by persons skilled in the relevant art(s) from the teachings herein:

TABLE 2

| time | number of users $Y_{1,t}$ | number of users $Y_{2,t}$ | number of users $Y_{3,t}$ | number of users $Y_{4,t}$ |
|---|---|---|---|---|
| t = 1 | 0 | 0 | 0 | 0 |
| t = 2 | 1 | 0 | 0 | 0 |
| t = 3 | 2 | 0 | 1 | 0 |

For example, as indicated in Tables 1 and 2, because no users that became active at time t=0 had associated active users, all values of $Y_{c,1}$ (first row of Table 2) are equal to zero. User 102d had 1 associated active user (user 102a) when user 102d became active at time t=2, and thus $Y_{1,2}$ equals 1 (all other values of $Y_{c,2}$ are equal to zero). Two users 102c and 102f each had one associated active user (user 102b and user 102d, respectively) when they became active at time t=3, and thus $Y_{1,3}$ equals 2. User 102e had 3 associated active users (users 102a, 102b, and 102d) when user 102e became active at time t=3, and thus $Y_{3,3}$ equals 1 (the remaining values $Y_{2,3}$ and $Y_{4,3}$ are equal to zero).

In step 704, a first number of users $N_{c,t}$ of the set of users is determined for each time t of the plurality of times t that were inactive at time t, had a number of c associated active users at time t, and did not become active at time t. For example, in an embodiment, inactive user determiner 604 may be configured to perform step 704. As shown in FIG. 6, inactive user determiner 604 receives social network data 304. Inactive user determiner 604 analyzes social network data 304 to determine for each time t (e.g., over the time period 0 . . . T) a number of users, designated as $N_{c,t}$, that were inactive at that time t, had a number c of active associated users at that time t, and that did not become active at that time t. For instance, inactive user determiner 604 may perform this function over a range of c, for all c≤R, where R may be an integer selected for a particular application (e.g., because the values of $Y_{c,t}$ tend to decrease quickly and lose their statistical significance as c increases). For example, R may be equal to 10 or other integer value. As shown in FIG. 6, inactive user determiner 604 generates inactive user data 612, which includes the generated values for $N_{c,t}$ over predetermined ranges of c and t.

For instance, in the example of social network 800 shown in FIG. 8, and the data of Table 1, inactive user determiner 604 may calculate the following values for $N_{c,t}$ shown in Table 3 for each of times t=1, 2, 3 by generating the appropriate sums in a manner as would be understood by persons skilled in the relevant art(s) from the teachings herein:

TABLE 3

| time | number of users $N_{1,t}$ | number of users $N_{2,t}$ | number of users $N_{3,t}$ | number of users $N_{4,t}$ |
|---|---|---|---|---|
| t = 1 | 0 | 0 | 0 | 0 |
| t = 2 | 1 | 0 | 0 | 0 |
| t = 3 | 0 | 0 | 0 | 0 |

For example, as indicated in Tables 1 and 2, because no users at time t=0 had associated active users, all values of $N_{c,1}$ (first row of Table 3) are equal to zero. User 102e had 1 associated active user (user 102a) at time t=2, and user 102e was not active and did not become active at time t=2, so $N_{1,2}$ equals 1 (all other values of $N_{c,2}$ are equal to zero). Because all users became active at time t=3 (or earlier), all values of $N_{c,3}$ are equal to zero.

In step 706, a first estimate is generated of a coefficient α using a maximum likelihood logistic regression based on the determined first number of users $Y_{c,t}$ and the determined first number of users $N_{c,t}$. For example, in an embodiment, logistic regression estimator 606 may be configured to perform step 706. As shown in FIG. 6, logistic regression estimator 606 receives the determined first number of users $Y_{c,t}$ in active user data 608 and the determined first number of users $N_{e,t}$ in inactive user data 612. Logistic regression estimator 606 is configured to generate a coefficient α, which is representative of social correlation, based on active user data 608 and inactive user data 612. In an embodiment, logistic regression estimator 606 is configured to generate the coefficient α using maximum likelihood logistic regression, although in other embodiments, logistic regression estimator 606 may generate coefficient α using other techniques, as would be known to persons skilled in the relevant art(s).

Figure 9:
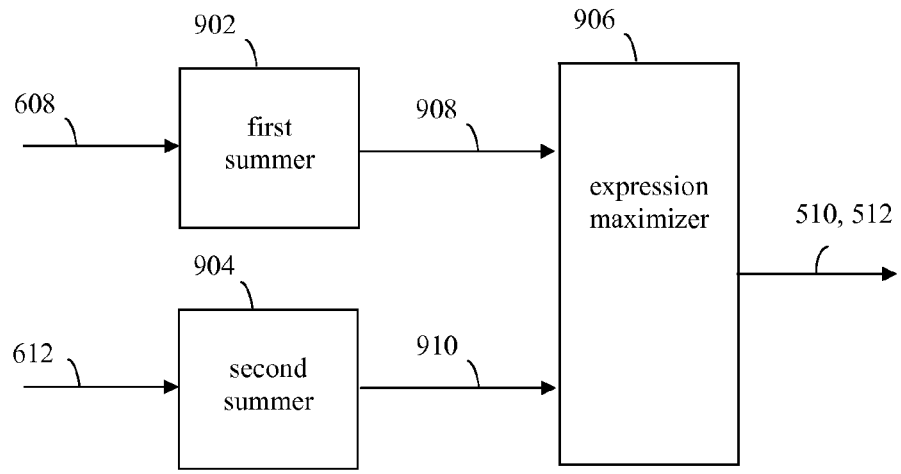
FIG. 9 shows a block diagram of a logistic regression estimator, according to an example embodiment.
Figure 10:
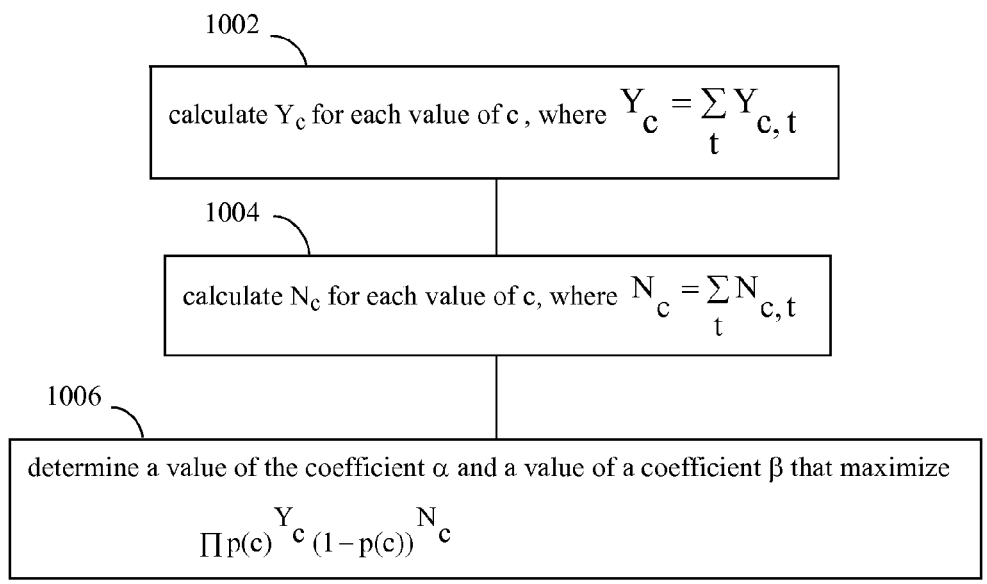
FIG. 10 shows a flowchart for performing maximum likelihood logistic regression, according to an example embodiment.

Logistic regression estimator 606 may generate the coefficient α in various ways. For instance, FIG. 9 shows a block diagram of logistic regression estimator 606, according to an example embodiment. In the example of FIG. 9, logistic regression estimator 606 is configured to generate estimated values for coefficients α and β using maximum likelihood logistic regression. As shown in FIG. 9, logistic regression estimator 606 includes a first summer 902, a second summer 904, and an expression maximizer 906. Logistic regression estimator 606 of FIG. 9 may operate in various ways. For instance, FIG. 10 shows a flowchart 1000 for performing maximum likelihood logistic regression, according to an example embodiment. In an embodiment, logistic regression estimator 606 of FIG. 9 may perform flowchart 1000. Further structural and operational embodiments will be apparent to persons skilled in the relevant art(s) based on the discussion regarding flowchart 1000. Flowchart 1000 and logistic regression estimator 606 of FIG. 9 are described as follows.

Flowchart 1000 begins with step 1002. In step 1002, $Y_c$ is calculated for each value of c, where $$Y_c = \sum_t Y_{c,t}. \qquad \text{Equation 3}$$

For example, in an embodiment, first summer 902 may be configured to calculate $Y_c$ for each value of c, according to Equation 3 shown above. As shown in FIG. 9, first summer 902 generates a first sum 908, which includes the calculated values for $Y_c$.

For example, referring to social network 800 of FIG. 8, and the data shown in Table 1 above, first summer 902 may generate the values for $Y_c$ shown in Table 4 below:

TABLE 4

| number of active associated users | Yc |
|---|---|
| c = 1 | 0 + 1 + 2 = 3 |
| c = 2 | 0 + 0 + 0 = 0 |
| c = 3 | 0 + 0 + 1 = 1 |
| c = 4 | 0 + 0 + 0 = 0 |

In step 1004, $N_c$ is calculated for each value of c, where $$N_c = \sum_t N_{c,t}. \qquad \text{Equation 4}$$

For example, in an embodiment, second summer 904 may be configured to calculate $N_c$ for each value of c, according to Equation 4 shown above. As shown in FIG. 9, second summer 904 generates a second sum 910, which includes the calculated values for $N_c$.

For example, referring to social network 800 of FIG. 8, and the data shown in Table 1 above, second summer 904 may generate the values for $N_c$ shown in Table 5 below:

TABLE 5

| number of active associated users | Nc |
|---|---|
| c = 1 | 0 + 1 + 0 = 1 |
| c = 2 | 0 + 0 + 0 = 0 |
| c = 3 | 0 + 0 + 0 = 0 |
| c = 4 | 0 + 0 + 0 = 0 |

In step 1006, a value of the coefficient α and β a value of a coefficient β are determined that maximize $$\prod_c p(c)^{Y_c}(1 - p(c))^{N_c}, \text{ where} \qquad \text{Equation 5}$$

$$p(c) = \frac{e^{\alpha \ln(c+1)+\beta}}{1 + e^{\alpha \ln(c+1)+\beta}}. \qquad \text{Equation 1}$$

For example, in an embodiment, expression maximizer 906 may be configured to determine values for the coefficients α and for β that maximize Equation 5 shown above. As shown in FIG. 9, expression maximizer 906 generates first estimate 510, which includes the determined value for the coefficient α (and may optionally include the determined value for the coefficient β). As described above, the coefficient α indicates a degree of social correlation in the social network.

Expression maximizer 906 may be configured in various ways to determine values for the coefficients α and for β that maximize Equation 5, as would be known to persons skilled in the relevant art(s). For example, many commercially available software packages and programming languages may be used to make this determination. For instance, Matlab®, which is published by The MathWorks™ of Natick, Mass., may be used to determine values for the coefficients α and for β that maximize Equation 5, as well as the R programming language.

2. Example Embodiments for Data Modification

Data modifier 502 may be configured in various ways to modify social network data 304 to generate modified social network data 304, according to step 406 of flowchart 400 in FIG. 4. For instance, as described above, according to a "shuffle test," time values for users in a social network becoming active may be shuffled. In another example embodiment, according to an "edge reversal test," the directions of associations/relationships between users in a social network may be reversed. Both of these embodiments are described as follows. Note that social network data 304 may be modified in further ways.

Figure 11:
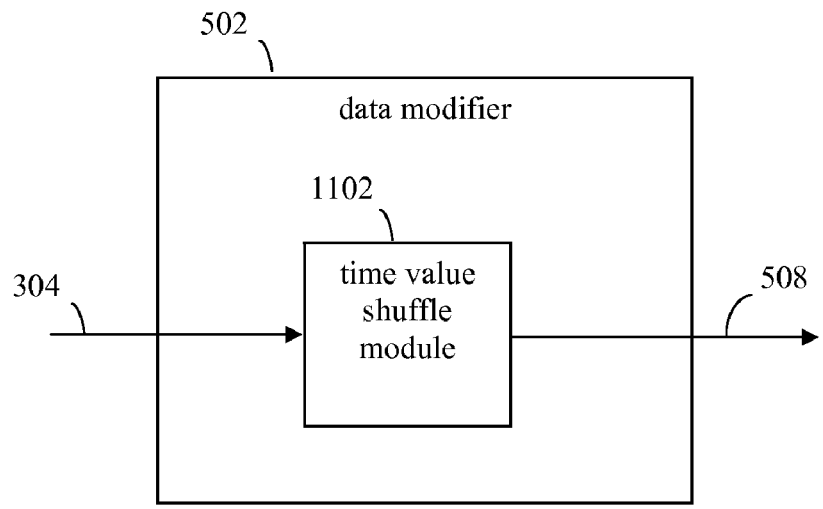
FIGS. 11 and 12 show block diagrams of data modifiers, according to example embodiments.

FIG. 11 shows a block diagram of data modifier 502, according to an example embodiment. As shown in FIG. 11, data modifier 502 includes a time value shuffle module 1102. Time value shuffle module 1102 is configured to shuffle time values indicating active times for users in a social network to enable social influence to be determined according to the shuffle test. According to the shuffle test, if social influence does not play a role in a social network, even though the probability of the activation of a user may depend on other users associated with the user, the timing of such activation is independent of the timing of the activation of the other users.

In a social network, $W=\{w_1, \ldots, w_n\}$ may be the set of users that are activated during the time period [0; T], where each user $w_1$ is first activated at a corresponding time $t_i$. After calculating values for $Y_c$ and $N_c$, as described in the prior subsection, and generating a first estimate of coefficient α, the time values of the users may be shuffled. For example, as shown in FIG. 11, time value shuffle module 1102 receives social network data 304, which includes the activation time values for each user. Time value shuffle module 1102 may shuffle the time values in any manner, including in a random manner. For example, time value shuffle module 1102 may select a random permutation π of $\{1 \ldots n\}$, and may set the time of activation of user $w_1$ to $t'_i := t_{\pi(i)}$, performing this selection for each user w. Subsequently, second values for $Y_c$ and $N_c$ may be generated that are used to generate a second estimate of coefficient α. The shuffle test indicates that social influence is not present if the first and second estimates are the same or substantially close to each other in value.

A example reason that the shuffle test rules out social influence in instances generated according to the social correlation model is the following: in the first estimate generated of coefficient α, the time stamps $t_i$ are independent, identically distributed (i.i.d.) from a distribution T over [0; T]. For the second estimate of coefficient α, the time stamps are permutated, and hence the new $t'_i$ values are still i.i.d. from the same distribution T. Therefore, the two estimates are generated from the same distribution, and lead to the same expected social correlation coefficient.

For example, referring to social network 800 of FIG. 8, and the data listed in Table 1 shown above, time value shuffle module 1102 may shuffle time values of activation for users 102a-102f as follows in Table 6:

TABLE 6

| user | time user became active | shuffled time values |
|------|------|------|
| user 102a | t = 1 | t' = 2 |
| user 102b | t = 2 | t' = 3 |
| user 102c | t = 3 | t' = 3 |
| user 102d | t = 2 | t' = 2 |
| user 102e | t = 3 | t' = 3 |
| user 102f | t = 3 | t' = 1 |

The shuffled time values shown in Table 6 are provided for illustrative purposes and are not intended to be limiting. As indicated above, the time values of activation of users in a social network may be shuffled in any manner. These time shuffled values may be included in modified social network data 508 output by data modifier 502 for users 102a-102f.

Figure 12:
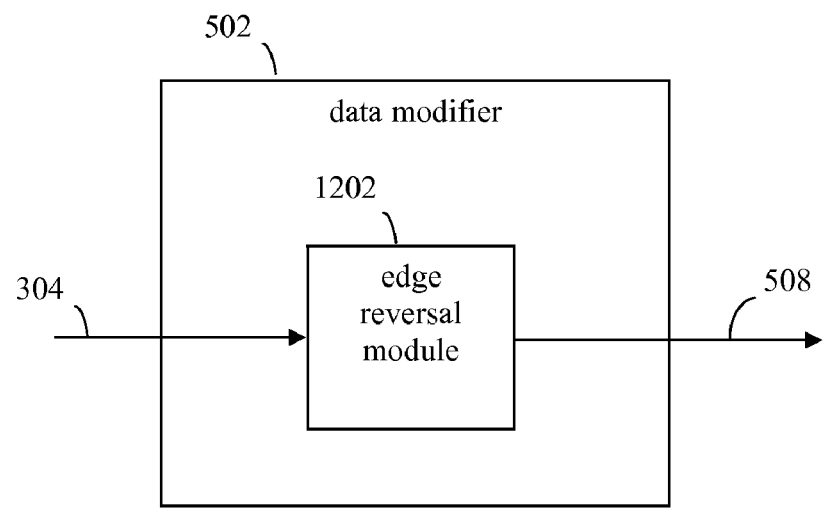

In another embodiment, FIG. 12 shows a block diagram of data modifier 502, according to an example embodiment. As shown in FIG. 12, data modifier 502 includes an edge reversal module 1202. Edge reversal module 1202 is configured to reverse the directions of associations/relationships between users in a social network to enable social influence to be determined according to the edge reversal test. According to the edge reversal test, because social influence spreads in the direction specified by the associations in the social network, reversing the direction of the associations changes the estimate of social correlation. In a similar manner as above, a first estimate of the coefficient α may be generated, the directions of associations may be reversed, and a second estimate of the coefficient α may be generated. The edge reversal test indicates that social influence is not present if the first and second estimates are the same or substantially close to each other in value.

Figure 13:
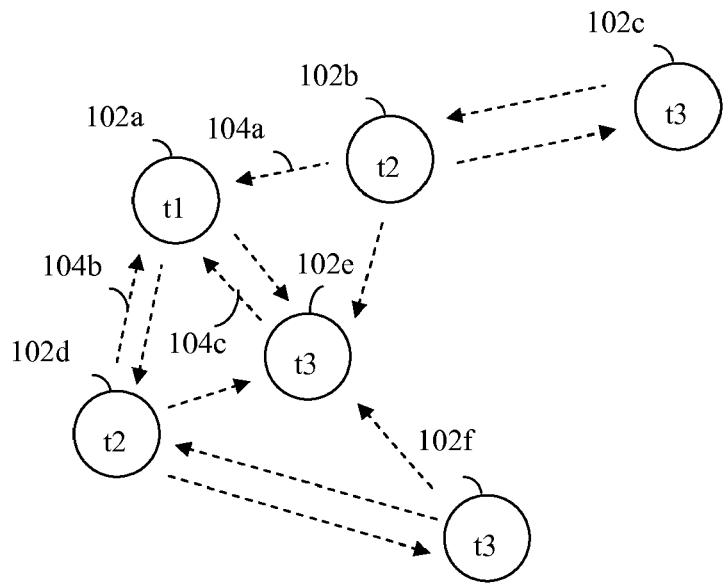
FIG. 13 shows a block diagram of a social network after a direction of each association indicator has been reversed, according to an example embodiment.

For instance, FIG. 13 shows a block diagram of social network 800 after each a direction of each association indicator 104 has been reversed, according to an example embodiment. By reversing directions of association indicators 104, a list of associated users for each user 102 in social network 800 is modified. For example, as shown by comparing FIGS. 8 and 13, the direction of association indicators 104a, 104b, and 104c are reversed. In FIG. 8, association indicators 104a-104c are directed from user 102a to users 102b, 102d, and 102e, respectively, indicating that user 102a lists users 102b, 102d, and 102e as "friends" or other type of association. In FIG. 13, association indicators 104a-104c are directed away from user 102a, and thus no longer define the users that user 102a indicates as friends. Instead, in FIG. 13, after reversal of all association indicators, association indicators are directed from user 102a to users 102d and 102e. Thus, by reversing the direction of association indicators in social network 800, the group of users indicated as friends of user 102a changed from users 102b, 102d, and 102e to users 102d and 102e, the group of friends indicated as friends of user 102b changed from user 102c to users 102a, 102c, and 102e, etc. In a similar manner, the group of users indicated as friends of each other user in social network 800 may have been modified due to reversing the direction of association indicators. The resulting modified association lists for users 102a-102f may be included in modified social network data 508 output by data modifier 502.

3. Example Embodiments for Social Correlation Based on Modified Social Network Data As described above, a second measure of social correlation is estimated according to step 408 of flowchart 400 in FIG. 4 based on the modified social network data generated according to step 406. In step 410 of flowchart 400, this second estimate of social correlation is compared to the first estimate of social correlation generated in step 404 to determine the presence of social influence.

In an embodiment, the second estimate of social correlation may be generated by social correlation determiner 504 in a similar manner as the first estimate is generated. As shown in FIG. 5, social correlation determiner 504 receives modified social network data 508, and generates second estimate 512. Social correlation determiner 504 may generate second estimate 512 based on modified social network data 508 in a similar manner as social correlation determiner 504 determines first estimate 510 based on social network data 304. For, instance, social correlation determiner 504 may perform flowchart 700 based on modified social network data 508 to generate second estimate 512.

For example, as shown in FIG. 6, active user determiner 602 and inactive user determiner 614 each receive modified social network data 508. In a similar fashion as described above for social network data 304, active user determiner 602 analyzes modified social network data 508 to determine for each time t (e.g., over the time period 0 . . . T) a second number of users, designated as $Y_{c,t}$, that had a number c of active associated users at that time t, and that became active at that time t. As shown in FIG. 6, active user determiner 602 generates second active user data 610, which includes the values for $Y_{c,t}$ generated based on modified social network data 508 over the predetermined ranges of c and t. Furthermore, inactive user determiner 604 analyzes modified social network data 508 to determine for each time t (e.g., over the time period 0 . . . T) a second number of users, designated as $N_{c,t}$, that were inactive at that time t, had a number c of active associated users at that time t, and that did not become active at that time t. As shown in FIG. 6, inactive user determiner 604 generates second inactive user data 614, which includes the values for $N_{c,t}$ generated based on modified social network data 508 over the predetermined ranges of c and t.

For example, if the shuffle test was performed by data modifier 502 to generate modified social network data 508, active user determiner 602 and inactive user determiner 604 generate $Y_{c,t}$ and $N_{c,t}$ based on the time shuffled values described above. With respect to the example of network 800 and Table 1 shown above, active user determiner 602 and inactive user determiner 604 generate $Y_{c,t}$ and $N_{c,t}$ for users 102a-102f based on the time shuffled values of Table 6. If the edge reversal test was performed by data modifier 502 to generate modified social network data 508, active user determiner 602 and inactive user determiner 604 generate $Y_{c,t}$ and $N_{c,t}$ based on the reversed associations (e.g., reversed friend indications, etc.) described above. With respect to the example of network 800 and Table 1 shown above, active user determiner 602 and inactive user determiner 604 generate $Y_{c,t}$ and $N_{c,t}$ for users 102a-102f based on the association lists resulting from the association indicator reversals of shown in FIG. 13.

As shown in FIG. 6, logistic regression estimator 606 receives the determined second number of users $Y_{c,t}$ in second active user data 610 and the determined second number of users $N_{c,t}$ in inactive user data 614. Logistic regression estimator 606 is configured to generate a second value for the coefficient α, which is representative of social correlation based on second active user data 610 and second inactive user data 614. As described above, in an embodiment, logistic regression estimator 606 may be configured to generate the second value for coefficient α using maximum likelihood logistic regression, although in other embodiments, logistic regression estimator 606 may generate the second value for coefficient α using other techniques, as would be known to persons skilled in the relevant art(s). For example, logistic regression estimator 606 may be configured as shown in FIG. 9, and described above, to generate second estimate 512, and may operate according to flowchart 1000 shown in FIG. 10, in an embodiment.

For instance, in an embodiment, second values for $Y_c$ and $N_c$ may be generated (e.g., by first and second summers 902 and 904, respectively; according to steps 1002 and 1004, respectively). In FIG. 9, first summer 902 may receive second active user data 610, and second summer 904 may receive second inactive user data 614, and may generate second values for first sum 908 (e.g., according to Equation 3) and second sum 910 (e.g., according to Equation 4), respectively, based thereon. Expression maximizer 906 may receive the second values for first sum 908 and second sum 910, and generate second estimate 512 based thereon (e.g., by generating second values for the coefficients α and β that maximize Equation 5).

4. Example Embodiments for Social Influence Detection

As described above, in step 410 of flowchart 400, the second estimate of social correlation generated in step 408 is compared to the first estimate of social correlation generated in step 404 to determine the presence of social influence. For example, as described above, in an embodiment, social correlation comparator 506 in FIG. 5 may be configured to compare first estimate 510 to second estimate 512 to determine the presence of social influence. As shown in FIG. 5, social correlation comparator 506 generates social influence indication 306.

Figure 14:
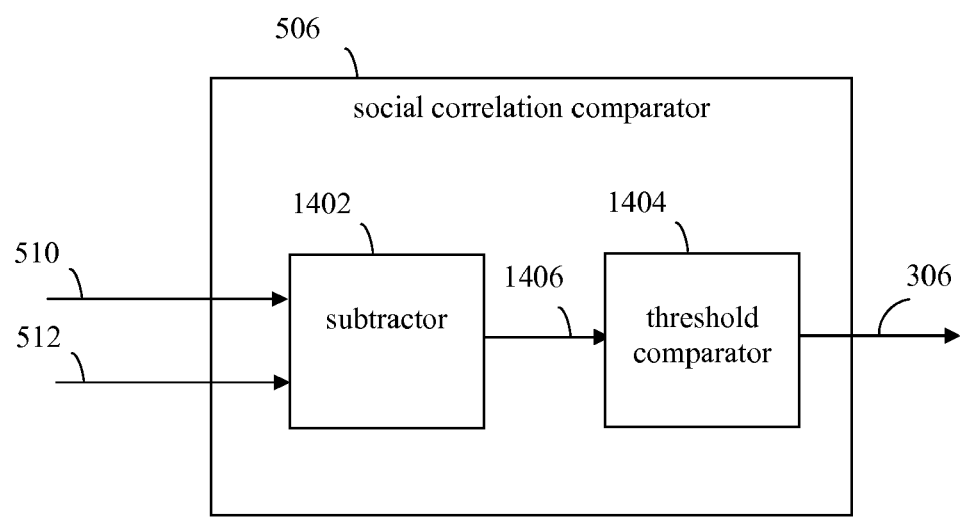
FIG. 14 shows a block diagram of a social correlation comparator, according to an example embodiment.

Social correlation comparator 506 may be configured in various ways. For instance, FIG. 14 shows a block diagram of social correlation comparator 506, according to an example embodiment. As shown in FIG. 14, social correlation comparator 506 includes a subtractor 1402 and a threshold comparator 1404. Subtractor 1402 is configured to determine a difference between first estimate 510 and second estimate 512 (e.g., to determine a difference between first and second determined values of the coefficient α). As shown in FIG. 14, subtractor 1402 generates a difference value 1406. Threshold comparator 1404 is configured to compare difference value 1406 to a predetermined threshold value to generate social influence indication 306. In an embodiment, social influence is determined to be present in the social network if difference value 1406 is greater than the predetermined threshold value, or has other predetermined relation with the predetermined threshold value. For example, if first and second estimates 510 and 512 are relatively close together in value (e.g., the difference is less than a predetermined threshold value), social influence indication 306 may indicate that social influence was not detected (is not present). If first and second estimates 510 and 512 are relatively far apart in value (e.g., the difference is greater than a predetermined threshold value), social influence indication 306 may indicate that social influence was detected (is present). Any suitable predetermined threshold value may be used, depending on the particular application, including values such as 0.1, 0.5, 1.0, etc.

In another embodiment, threshold comparator 1404 may not be present in social correlation comparator 506. In such an embodiment, subtractor 1402 is configured to determine difference value 1406 as a difference between first estimate 510 and second estimate 512, and difference value 1406 may be output from social correlation comparator 506 (in a scaled or non-scaled form) as social influence indication 306. In such an embodiment, difference value 1406 may indicate a degree of social influence in the social network, which is proportional to the difference value 1406. For example, a greater amount of social influence may be present if difference value 1406 is a relatively greater value. A lesser amount of social influence may be present if difference value 1406 is a relatively lesser value.

III. Example Computer Implementations

Social influence detector system 302, data modifier 502, social correlation determiner 504, social correlation comparator 506, active user determiner 602, inactive user determiner 604, logistic regression estimator 606, first summer 902, second summer 904, expression maximizer 906, time value shuffle module 1102, edge reversal module 1202, subtractor 1402, and threshold comparator 1404 may be implemented in hardware, software, firmware, or any combination thereof. For example, social influence detector system 302, data modifier 502, social correlation determiner 504, social correlation comparator 506, active user determiner 602, inactive user determiner 604, logistic regression estimator 606, first summer 902, second summer 904, expression maximizer 906, time value shuffle module 1102, edge reversal module 1202, subtractor 1402, and/or threshold comparator 1404 may be implemented as computer program code configured to be executed in one or more processors. Alternatively, social influence detector system 302, data modifier 502, social correlation determiner 504, social correlation comparator 506, active user determiner 602, inactive user determiner 604, logistic regression estimator 606, first summer 902, second summer 904, expression maximizer 906, time value shuffle module 1102, edge reversal module 1202, subtractor 1402, and/or threshold comparator 1404 may be implemented as hardware logic/electrical circuitry.

Figure 15:
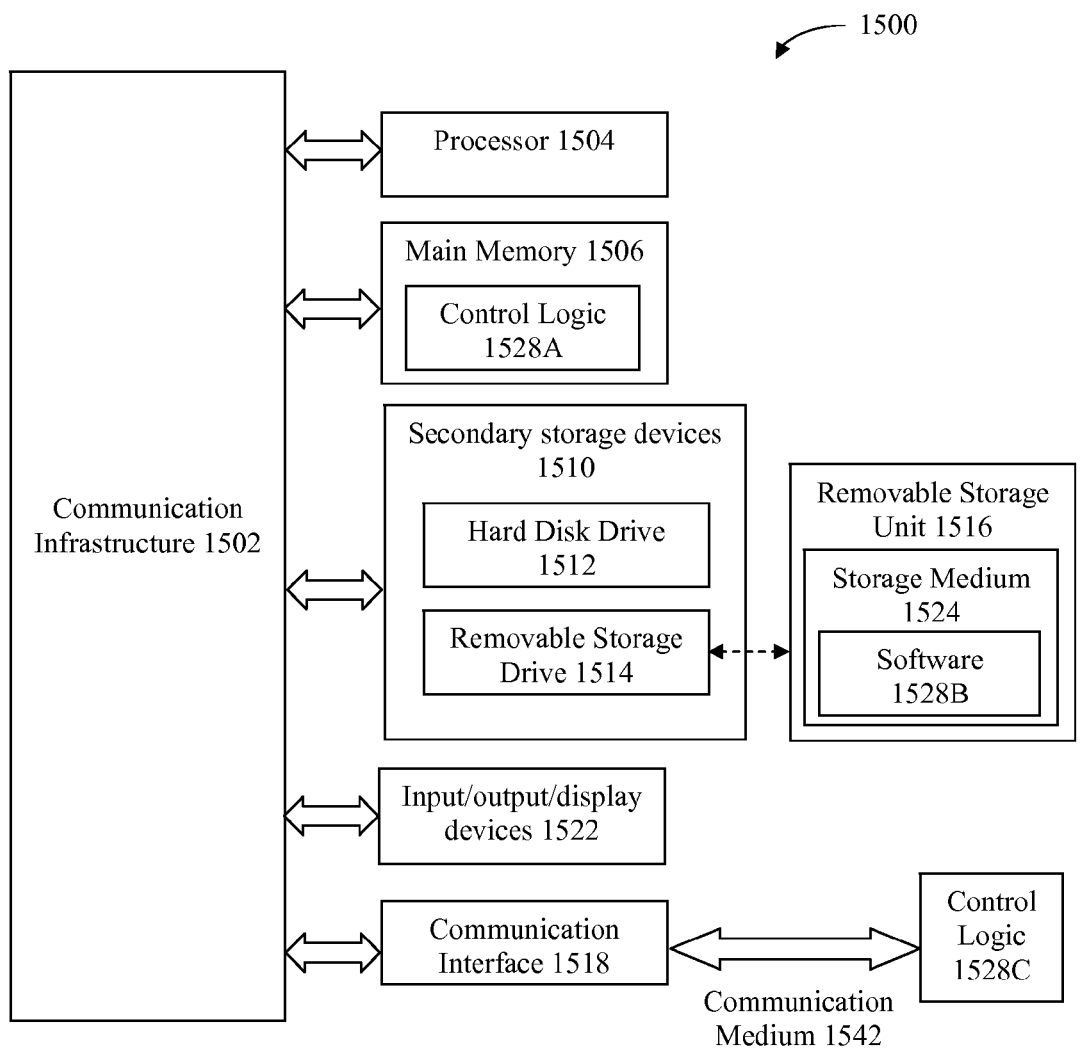
FIG. 15 shows a block diagram of an example computer system in which embodiments of the present invention may be implemented.

The embodiments described herein, including systems, methods/processes, and/or apparatuses, may be implemented using well known servers/computers, such as a computer 1500 shown in FIG. 15. For example, embodiments of social influence detector system 302 can be implemented using one or more computers 1500.

Computer 1500 can be any commercially available and well known computer capable of performing the functions described herein, such as computers available from International Business Machines, Apple, Sun, HP, Dell, Cray, etc. Computer 1500 may be any type of computer, including a desktop computer, a server, etc.

Computer 1500 includes one or more processors (also called central processing units, or CPUs), such as a processor 1504. Processor 1504 is connected to a communication infrastructure 1502, such as a communication bus. In some embodiments, processor 1504 can simultaneously operate multiple computing threads.

Computer 1500 also includes a primary or main memory 1506, such as random access memory (RAM). Main memory 1506 has stored therein control logic 1528A (computer software), and data.

Computer 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, computer 1500 may include an industry standard interface, such a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer useable or readable storage medium 1524 having stored therein computer software 1528B (control logic) and/or data. Removable storage unit 1516 represents a floppy disk, magnetic tape, compact disk, DVD, optical storage disk, or any other computer data storage device. Removable storage drive 1514 reads from and/or writes to removable storage unit 1516 in a well known manner.

Computer 1500 also includes input/output/display devices 1522, such as monitors, keyboards, pointing devices, etc.

Computer 1500 further includes a communication or network interface 1518. Communication interface 1518 enables the computer 1500 to communicate with remote devices. For example, communication interface 1518 allows computer 1500 to communicate over communication networks or mediums 1542 (representing a form of a computer useable or readable medium), such as LANs, WANs, the Internet, etc. Network interface 1518 may interface with remote sites or networks via wired or wireless connections.

Control logic 1528C may be transmitted to and from computer 1500 via the communication medium 1542.

Any apparatus or manufacture comprising a computer useable or readable medium having control logic (software) stored therein is referred to herein as a computer program product or program storage device. This includes, but is not limited to, computer 1500, main memory 1506, secondary storage devices 1510, and removable storage unit 1516. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for implementing social influence detector system 302, data modifier 502, social correlation determiner 504, social correlation comparator 506, active user determiner 602, inactive user determiner 604, logistic regression estimator 606, first summer 902, second summer 904, expression maximizer 906, time value shuffle module 1102, edge reversal module 1202, subtractor 1402, threshold comparator 1404, flowchart 400, flowchart 700, and/or flowchart 1000 (including any one or more steps of flowcharts 400, 700, and 1000), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

IV. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for detecting social influence between users in a set of users with regard to an activity, comprising:
    receiving data for each user of the set of users that includes a time value at which the user became active with regard to the activity, and includes at least one indication of another user in the set of users associated with the user;
    determining a first estimate of social correlation in the set of users based on the data;
    modifying the data;
    determining a second estimate of social correlation in the set of users based on the modified data; and
    comparing the first estimate to the second estimate to determine a degree of social influence in the set of users,
    wherein comparing includes determining that social influence is present in the set of users if a difference between the first estimate and the second estimate of the coefficient $\alpha$ is greater than a predetermined threshold.

2. The method of claim 1, wherein said determining a first estimate of social correlation in the set of users based on the data comprises:
    determining a first number of users $Y_{c,t}$ of the set of users for each time t of a plurality of times t that had a number of c associated active users at time t and that became active at time t,
    determining a first number of users $N_{c,t}$ of the set of users for each time t of the plurality of times t that were inactive at time t, had a number of c associated active users at time t, and did not become active at time t, and
    generating a first estimate of a coefficient $\alpha$ using a maximum likelihood logistic regression based on the determined first number of users $Y_{c,t}$ and the determined first number of users $N_{c,t}$, wherein the coefficient $\alpha$ indicates a degree of social correlation in the set of users;
    wherein said determining a second estimate of social correlation in the set of users based on the modified data comprises:
        determining a second number of users $Y_{c,t}$ of the set of users for each time t of the plurality of times t based on the modified data,
        determining a second number of users $N_{c,t}$ of the set of users for each time t of the plurality of times t based on the modified data, and
        generating a second estimate of the coefficient $\alpha$ using the maximum likelihood logistic regression based on the determined second number of users $Y_{c,t}$ and the determined second number of users $N_{c,t}$; and
    wherein said comparing the first estimate to the second estimate to determine a degree of social influence between the users in the set of users comprises:
        comparing the first estimate of the coefficient $\alpha$ to the second estimate of the coefficient $\alpha$ to determine the degree of social influence.

3. The method of claim 2, wherein said generating a first estimate of a coefficient $\alpha$ using a maximum likelihood logistic regression based on the determined first number of users $Y_{c,t}$ and the determined first number of users $N_{c,t}$ comprises:
    calculating $Y_c$ for each value of c, where $$Y_c = \sum_t Y_{c,t}.$$

calculating $N_c$ for each value of c, where $$N_c = \sum_t N_{c,t}.$$

and
    determining a value of the coefficient $\alpha$ and a value of a coefficient $\beta$ that maximize $$\prod_c p(c)^{Y_c}(1-p(c))^{N_c} \text{ where}$$

$$p(c) = \frac{e^{\alpha \ln(c+1)+\beta}}{1+e^{\alpha \ln(c+1)+\beta}}.$$

4. The method of claim 1, wherein said modifying the data comprises:
    shuffling time values in the data between users of the set of users.

5. The method of claim 1, wherein said modifying the data comprises:
    reversing a direction of each indication of association between users of the set of users in the data.

6. A method for detecting social influence between users in a set of users with regard to an activity, comprising:
    receiving data for each user of the set of users that includes a time value at which the user became active with regard to the activity, and includes at least one indication of another user in the set of users associated with the user;
    determining a first estimate of social correlation in the set of users based on the data;
    modifying the data
    determining a second estimate of social correlation in the set of users based on the modified data; and
    comparing the first estimate to the second estimate to determine a degree of social influence in the set of users,
    wherein comparing includes determining that a relatively greater amount of social influence is present in the set of users if a difference between the first estimate and the second estimate of the coefficient $\alpha$ is a relatively greater value, and that a relatively lesser amount of social influence is present in the set of users if the difference between the first estimate and the second estimate of the coefficient $\alpha$ is a relatively lesser value.

7. A system for detecting social influence between users in a set of users with regard to an activity, comprising:
  a social correlation determiner that receives data for each user of the set of users that includes a time value at which the user became active with regard to the activity, and includes at least one indication of another user in the set of users associated with the user, the social correlation determiner being configured to determine a first estimate of social correlation in the set of users based on the data;
  a data modifier configured to modify the data; and
  a social correlation comparator;
  the social correlation determiner being configured to receive the modified data, and to determine a second estimate of social correlation in the set of users based on the modified data; and
  the social correlation comparator being configured to compare the first estimate to the second estimate to determine a degree of social influence in the set of users, the social correlation comparator including a subtractor configured to determine a difference between the first estimate and the second estimate of the coefficient $\alpha$; and
  wherein the social correlation comparator is configured to indicate a degree of social influence proportional to the determined difference.

8. The system of claim 7, wherein the social correlation determiner comprises:
  an active user determiner;
  an inactive user determiner; and
  a logistic regression estimator;
  wherein the active user determiner is configured to determine a first number of users $Y_{c,t}$ of the set of users for each time t of a plurality of times t that had a number of c associated active users at time t and that became active at time t;
  wherein the inactive user determiner is configured to determine a first number of users $N_{c,t}$ of the set of users for each time t of the plurality of times t that were inactive at time t, had a number of c associated active users at time t, and did not become active at time t;
  wherein the logical regression estimator is configured to generate a first estimate of a coefficient $\alpha$ using a maximum likelihood logistic regression based on the determined first number of users $Y_{c,t}$ and the determined first number of users $N_{c,t}$, wherein the coefficient $\alpha$ indicates a degree of social correlation in the set of users;
  wherein the active user determiner is configured to determine a second number of users $Y_{c,t}$ of the set of users for each time t of the plurality of times t based on the modified data;
  wherein the inactive user determiner is configured to determine a second number of users $N_{c,t}$ of the set of users for each time t of the plurality of times t based on the modified data;
  wherein the logical regression estimator is configured to generate a second estimate of the coefficient $\alpha$ using the maximum likelihood logistic regression based on the determined second number of users $Y_{c,t}$ and the determined second number of users $N_{c,t}$; and
  wherein the social correlation comparator is configured to compare the first estimate of the coefficient $\alpha$ to the second estimate of the coefficient $\alpha$ to determine the degree of social influence.

9. The system of claim 8, wherein the logical regression estimator comprises:
  a first summer configured to calculate $Y_c$ for each value of c, where $$Y_c = \sum_t Y_{c,t};$$

a second summer configured to calculate $N_c$ for each value of c, where $$N_c = \sum_t N_{c,t};$$

and
  an expression maximizer configured to determine a value of the coefficient $\alpha$ and a value of a coefficient $\beta$ that maximize $$\prod_c p(c)^{Y_c}(1-p(c))^{N_c} \text{ where}$$

$$p(c) = \frac{e^{\alpha \ln(c+1)+\beta}}{1+e^{\alpha \ln(c+1)+\beta}}.$$

10. The system of claim 7, the data modifier comprises:
  a time value shuffle module configured to shuffle time values in the data between users of the set of users.

11. The system of claim 7, wherein the data modifier comprises:
  an edge reversal module configured to reverse a direction of each indication of association between users of the set of users in the data.

12. A system for detecting social influence between users in a set of users with regard to an activity, comprising:
  a social correlation determiner that receives data for each user of the set of users that includes a time value at which the user became active with regard to the activity, and includes at least one indication of another user in the set of users associated with the user, the social correlation determiner being configured to determine a first estimate of social correlation in the set of users based on the data;
  a data modifier configured to modify the data; and
  a social correlation comparator;
  the social correlation determiner being configured to receive the modified data, and to determine a second estimate of social correlation in the set of users based on the modified data; and
  the social correlation comparator being configured to compare the first estimate to the second estimate to determine a degree of social influence in the set of users, the social correlation comparator including:
    a subtractor configured to determine a difference between the first estimate and the second estimate of the coefficient $\alpha$; and
    a threshold comparator configured to compare the determined difference to a predetermined threshold;
  wherein social influence is determined to be present in the set of users if the determined difference is greater than the predetermined threshold.

13. A computer program product comprising a non-transitory computer-readable medium having computer program logic recorded thereon for enabling a processor to detect social influence between users in a set of users with regard to an activity, comprising:
  first computer program logic means for enabling that enables the processor to receive data for each user of the set of users that includes a time value at which the user became active with regard to the activity, and includes at least one indication of another user in the set of users associated with the user;

second computer program logic means for enabling that enables the processor to determine a first estimate of social correlation in the set of users based on the data;

third computer program logic means for enabling that enables the processor to modify the data;

fourth computer program logic means for enabling that enables the processor to determine a second estimate of social correlation in the set of users based on the modified data; and fifth computer program logic means for enabling that enables the processor to compare the first estimate to the second estimate to determine a degree of social influence in the set of users, and to determine that social influence is present in the set of users if a difference between the first estimate and the second estimate of the coefficient $\alpha$ is greater than a predetermined threshold.

14. The computer program product of claim 13, wherein said second computer program logic comprises:

sixth computer program logic that enables the processor to determine a first number of users $Y_{c,t}$ of the set of users for each time t of a plurality of times t that had a number of c associated active users at time t and that became active at time t, seventh computer program logic that enables the processor to determine a first number of users $N_{c,t}$ of the set of users for each time t of the plurality of times t that were inactive at time t, had a number of c associated active users at time t, and did not become active at time t, and eighth computer program logic that enables the processor to generate a first estimate of a coefficient $\alpha$ using a maximum likelihood logistic regression based on the determined first number of users $Y_{c,t}$ and the determined first number of users $N_{c,t}$, wherein the coefficient $\alpha$ indicates a degree of social correlation in the set of users;

wherein said fourth computer program logic comprises:

ninth computer program logic that enables the processor to determine a second number of users $Y_{c,t}$ of the set of users for each time t of the plurality of times t based on the modified data, tenth computer program logic that enables the processor to determine a second number of users $N_{c,t}$ of the set of users for each time t of the plurality of times t based on the modified data, and eleventh computer program logic that enables the processor to generate a second estimate of the coefficient $\alpha$ using the maximum likelihood logistic regression based on the determined second number of users $Y_{c,t}$ and the determined second number of users $N_{c,t}$; and wherein said fifth computer program logic means comprises:

twelfth computer program logic that enables the processor to compare the first estimate of the coefficient $\alpha$ to the second estimate of the coefficient $\alpha$ to determine the degree of social influence.

15. The computer program product of claim 14, wherein said eighth computer program logic comprises:

computer program logic that enables the processor to calculate $Y_c$ for each value of c, where $$Y_c = \sum_t Y_{c,t},$$

computer program logic that enables the processor to calculate $N_c$ for each value of c, where $$N_c = \sum_t N_{c,t},$$

and computer program logic that enables the processor to determine a value of the coefficient $\alpha$ and a value of a coefficient $\beta$ that maximize $$\prod_c p(c)^{Y_c}(1-p(c))^{N_c} \text{ where}$$

$$p(c) = \frac{e^{\alpha \ln(c+1)+\beta}}{1+e^{\alpha \ln(c+1)+\beta}}.$$

16. The computer program product of claim 13, wherein said third computer program logic comprises:

computer program logic that enables the processor to shuffle time values in the data between users of the set of users.

17. The computer program product of claim 13, wherein said third computer program logic comprises:

computer program logic that enables the processor to reverse a direction of each indication of association between users of the set of users in the data.

* * * * *